(12) United States Patent
Stein et al.

(10) Patent No.: US 8,208,745 B2
(45) Date of Patent: Jun. 26, 2012

(54) SPATIAL DOMAIN VIDEO ENHANCEMENT/SCALING SYSTEM AND METHOD

(75) Inventors: Yosef Stein, Sharon, MA (US); Hazarathaiah Malepati, Norwood, MA (US)

(73) Assignee: Analog Devices, Inc., Norwood, MA (US)

( * ) Notice: Subject to any disclaimer, the term of this patent is extended or adjusted under 35 U.S.C. 154(b) by 795 days.

(21) Appl. No.: 12/079,547

(22) Filed: Mar. 27, 2008

(65) Prior Publication Data
US 2009/0196518 A1 Aug. 6, 2009

Related U.S. Application Data

(60) Provisional application No. 61/063,027, filed on Jan. 31, 2008.

(51) Int. Cl.
*G06K 9/36* (2006.01)
*G06K 9/46* (2006.01)
*G06K 9/32* (2006.01)
*H04N 11/02* (2006.01)

(52) U.S. Cl. ..... 382/250; 382/232; 382/298; 375/240.2; 375/240.24

(58) Field of Classification Search ............. 382/232, 382/250, 266, 298, 299; 358/445, 451; 348/395.1, 348/403.1, 420.1; 375/240.01, 240.2, 240.21, 375/240.24
See application file for complete search history.

(56) References Cited

U.S. PATENT DOCUMENTS

| | | | | |
|---|---|---|---|---|
| 5,168,375 A | * | 12/1992 | Reisch et al. | 382/250 |
| 5,253,055 A | * | 10/1993 | Civanlar et al. | 375/240.24 |
| 5,740,284 A | * | 4/1998 | Wober et al. | 382/250 |
| 5,784,494 A | | 7/1998 | Strongin et al. | |
| 5,832,135 A | * | 11/1998 | Merhav et al. | 382/260 |
| 5,903,312 A | | 5/1999 | Malladi et al. | |
| 5,933,538 A | | 8/1999 | Fukuda et al. | |
| 6,067,384 A | * | 5/2000 | Manickam et al. | 382/250 |
| 6,233,280 B1 | | 5/2001 | Kim et al. | |
| 6,301,304 B1 | | 10/2001 | Jing et al. | |
| 6,304,604 B1 | | 10/2001 | Adiletta et al. | |
| 6,507,614 B1 | | 1/2003 | Li | |
| 6,525,783 B1 | | 2/2003 | Kim et al. | |

(Continued)

OTHER PUBLICATIONS

Dugad, R.; Ahuja, N.; "A fast scheme for image size change in the compressed domain", IEEE Transactions on Circuits and Systems for Video Technology, 2001, v11, 461-474.*

(Continued)

*Primary Examiner* — Li Liu
(74) *Attorney, Agent, or Firm* — Knobbe Martens Olson & Bear LLP

(57) ABSTRACT

A method of spatial domain video enhancement/up-scaling including transforming the video input from the temporal domain to a K×K matrix of spatial domain coefficients; multiplying each spatial domain coefficient by corresponding elements of a K×K enhancement matrix to obtain enhanced spatial domain coefficients; depositing the enhanced spatial domain coefficients in the upper left K×K corner of a zero padded 2K×2K inverse transform matrix and inversely transforming them to scale the enhanced spatial domain coefficients and convert them back to video output temporal domain elements and a method of spatial domain video enhancement/down-scaling including transforming the video input from the temporal domain to a 2K×2K matrix of spatial domain coefficients; multiplying the upper left K×K corner of the 2K×2K matrix of spatial domain coefficients by the corresponding elements of a K×K enhancement matrix to obtain enhanced spatial domain coefficients; inversely transforming the K×K enhanced spatial domain coefficients to scale them and convert them back to video output temporal domain elements.

41 Claims, 6 Drawing Sheets

Scale-Up

U.S. PATENT DOCUMENTS

| | | |
|---|---|---|
| 6,526,099 B1 * | 2/2003 | Christopoulos et al. . 375/240.26 |
| 6,584,156 B1 | 6/2003 | Gu et al. |
| 2001/0008544 A1 | 7/2001 | Ishiyama |
| 2002/0009150 A1 | 1/2002 | Le Maguet |
| 2002/0012470 A1 | 1/2002 | Luna et al. |
| 2002/0113898 A1 | 8/2002 | Mitsuhashi |
| 2003/0021486 A1 * | 1/2003 | Acharya ................. 382/250 |

OTHER PUBLICATIONS

Young Seo Park; Hyun Wook Park, "Arbitrary-ratio image resizing using fast DCT of composite length for DCT-based transcoder", IEEE Transactions on Image Processing, v.15, 2006, 494-500.*

* cited by examiner

Enhancement matrix

| 0 | $c_1$ | $c_2$ | $c_3$ |
|---|---|---|---|
| $c_1$ | $c_2$ | $c_3$ | $c_4$ |
| $c_2$ | $c_3$ | $c_4$ | $c_5$ |
| $c_3$ | $c_4$ | $c_5$ | $c_6$ |

US 8,208,745 B2

SPATIAL DOMAIN VIDEO ENHANCEMENT/SCALING SYSTEM AND METHOD

This application claims benefit of and priority to U.S. Provisional Application Ser. No. 61/063,027 filed Jan. 31, 2008 (AD-537PR) incorporated herein by this reference.

FIELD OF THE INVENTION

This invention relates to a spatial domain video enhancement/scaling system and method.

BACKGROUND OF THE INVENTION

Video scaling is an algorithmic process device for converting video content between one arbitrary resolution/aspect-ratio and another resolution/aspect-ratio. A most common video scaling application is "upscaling", taking a low resolution (Standard Definition) video source and increasing the resolution to a high resolution (High Definition) video. This does not necessarily mean that the picture becomes clearer/more detailed—as scalers in their simplest form only increase the sample points for the original signal resulting in more data points for the original given information. Better scaling devices include other signal conditioning to maintain the original signal details when increasing the resolution. Another common video scaling application is "downscaling", taking a high resolution (High Definition) video source and reducing the resolution to a standard resolution (Standard Definition) home video; or taking DVD film standard resolution and downscaling it to a portable media player resolution. A video scaler can be combined with an Analog-to-Digital-Converter (ADC, or digitizer) and a Digital-to-Analog-Converter (DAC) to support analog inputs and outputs.

SUMMARY OF THE INVENTION

It is an object of this invention to provide a spatial domain video enhancement/scaling system and method which can both scale up or down and enhance the video.

It is a further object of this invention to provide such a spatial domain video enhancement/scaling system and method which is simple to implement in existing portable media players.

It is a further object of this invention to provide such a spatial domain video enhancement/scaling system and method which can scale and enhance an image meant for a small screen so it is suitable for large screen and HDTV displays.

It is a further object of this invention to provide such a spatial domain video enhancement/scaling system and method which can scale and enhance an image meant for a large screen so it is suitable for small screen displays.

It is a further object of this invention to provide such a spatial domain video enhancement/scaling system and method in which enhancement can be controlled by the user.

The invention results from the realization that truly efficient and effective spatial domain video enhancement/scaling easily adapted to existing video processes can be achieved in a scale up operation by transforming the video input from the temporal domain to a K×K matrix of spatial domain coefficients, multiplying each spatial domain coefficient by corresponding elements of a K×K enhancement matrix to obtain enhanced spatial domain coefficients, depositing the enhanced spatial domain coefficients in the upper left K×K corner of a zero padded 2K×2K inverse transform matrix and inversely transforming them to scale by 2× the enhanced spatial domain coefficients and convert them back to video output temporal domain elements and in a scale down operation by transforming the video input from the temporal domain to a 2K×2K matrix of spatial domain coefficients, multiplying the upper left K×K corner of the 2K×2K matrix of spatial domain coefficients by the corresponding elements of a K×K enhancement matrix to obtain enhanced spatial domain coefficients, and inversely transforming the K×K enhanced spatial domain coefficients to scale them by ½ and convert them back to video output temporal domain elements, and the further realization that by applying a bilinear interpolation to the video output temporal domain elements to scale the video by a factor of 0-2 to the final size so that scaling is not limited to factors of 2; and the still further realization that additional scaling can be achieved by including at least one intermediate operation before the bilinear interpolation, each intermediate operation including another transformation and inverse transformation between different size matrices.

The subject invention, however, in other embodiments, need not achieve all these objectives and the claims hereof should not be limited to structures or methods capable of achieving these objectives.

This invention features a spatial domain video enhancement/up-scaling system including a first stage including a K×K transform circuit for transforming the video input from the temporal domain to spatial domain coefficients. There is a multiplier for multiplying each spatial domain coefficient by corresponding elements of a K×K enhanced matrix to obtain enhancement spatial domain coefficients and depositing them in the upper left K×K corner of a zero padded 2K×2K inverse transform matrix. A 2K×2K inverse transform circuit scales the enhanced spatial domain coefficients and converts them back to temporal domain elements.

In a preferred embodiment the spatial domain video enhancing/up-scaling system may further include a bilinear interpolation stage to scale the temporal domain element video by a factor of 0-2 to the final size. There may be at least one intermediate stage between the first and bilinear interpolation stage. Each intermediate stage may include a K×K transform circuit for transforming the input of the temporal domain elements to spatial domain coefficients and depositing them in the upper left K×K corner of a zero padded 2K×2K inverse transform matrix; and a 2K×2K inverse transform circuit to scale the spatial domain coefficients and convert them back to video temporal domain elements. The first stage may include a filter to reduce image noise. The filter may be a median filter. The median filter may be a 3×3 median filter. The K×K transform circuit may be a DCT. The 2K×2K inverse transform circuit may be an 8×8 inverse transform circuit. The enhancement matrix may include a gain adjust circuit for varying the enhancement matrix elements. The enhancement matrix elements may be all unity (1's) and the system may perform only scaling This invention also features a spatial domain video enhancement/down-scaling system including a first stage having a 2K×2K transform circuit for transforming the video input from the temporal domain to spatial domain coefficients. There is a multiplier circuit for multiplying the upper left K×K corner of the 2K×2K spatial domain coefficients by the corresponding elements of a K×K enhancement matrix to obtain enhanced spatial domain coefficients. A K×K inverse transform circuit scales the enhanced spatial domain coefficients and converts them back to temporal domain elements.

In a preferred embodiment the spatial domain video enhancement/down-scaling system may further include a bilinear interpolation stage to scale the temporal domain element video by a factor of 0-½ to its final size. There may be at least one intermediate stage between the first stage and bilinear interpolation stage. Each intermediate stage may include a 2K×2K transform circuit for receiving temporal domain elements and transforming them to 2K×2K matrix of spatial domain coefficients and a K×K inverse transform circuit for inverse transforming of the spatial domain coefficients in the upper left K×K corner of the 2K×2K transform circuit to K×K temporal domain elements. The transform circuit may be a DCT. The K×K inverse transform circuit may be an IDCT. The 2K×2K transform circuit may be an 8×8 transform circuit. The K×K inverse transform circuit may be a 4×4 inverse transform circuit. The enhancement matrix elements may be all unity (1's) and the system performs only scaling.

This invention also features a method of spatial domain video enhancement/up-scaling including transforming the video input from the temporal domain to a K×K matrix of spatial domain coefficients; multiplying each spatial domain coefficient by corresponding elements of a K×K enhancement matrix to obtain enhanced spatial domain coefficients; depositing the enhanced spatial domain coefficients in the upper left K×K corner of a zero padded 2K×2K inverse transform matrix and inversely transforming them to scale the enhanced spatial domain coefficients and convert them back to video output temporal domain elements.

In a preferred embodiment the method of spatial domain video enhancement/up-scaling may further include applying a bilinear interpolation to the video output temporal domain elements to scale the video by a factor of 0-2 to the final size. The method of spatial domain video enhancement/up-scaling may further include at least one more intermediate operations before the bilinear intecmrpolation, each intermediate operation including transforming from the temporal domain to a K×K matrix of spatial domain coefficients and depositing the spatial coefficients in the upper left K×K corner of a zero padded 2K×2K inverse transform matrix to scale up the enhanced spatial domain coefficients and convert them back to video temporal elements. The video output temporal elements may be filtered to reduce image noise. The video output temporal elements may be median filtered. The transforming may include a DCT transformation. The inverse transforming may include an IDCT inverse transformation. The K×K matrix may be a 4×4 matrix. The 2K×2K matrix may be an 8×8 matrix. The method of spatial domain video enhancement/up-scaling may further include adjusting the gain of the enhancement matrix elements. The enhancement matrix elements may be all unity (1's) and only scaling is performed.

This invention also features a method of spatial domain video enhancement/scaling including transforming the video input from the temporal domain to a 2K×2K matrix of spatial domain coefficients; multiplying the upper left K×K corner of the 2K×2K matrix of spatial domain coefficients by the corresponding elements of a K×K enhancement matrix to obtain enhanced spatial domain coefficients; inversely transforming the K×K enhanced spatial domain coefficients to scale them and convert them back to video output temporal domain elements.

In a preferred embodiment the method of spatial domain video enhancement/down-scaling may further include applying a bilinear interpolation to the video output temporal domain elements to scale the video by a factor of 0-½ to the final size. The method of spatial domain video enhancement/down-scaling may further include at least one more intermediate operation before the bi-level interpolation, each intermediate operation including transforming temporal domain elements to a 2K×2K matrix of spatial domain coefficients and inversely transforming the spatial domain coefficients in the upper left corner of the 2K×2K matrix to K×K temporal domain elements. The transforming may be a DCT transformation. The inverse transforming may be an IDCT transformation. The K×K matrix may be a 4×4 matrix. The 2K×2K matrix may be an 8×8 matrix. The method of spatial domain video enhancement/down-scaling may further include adjusting the gain of the enhancement matrix elements. The enhancement matrix elements may be all unity (1's) and only scaling is performed.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
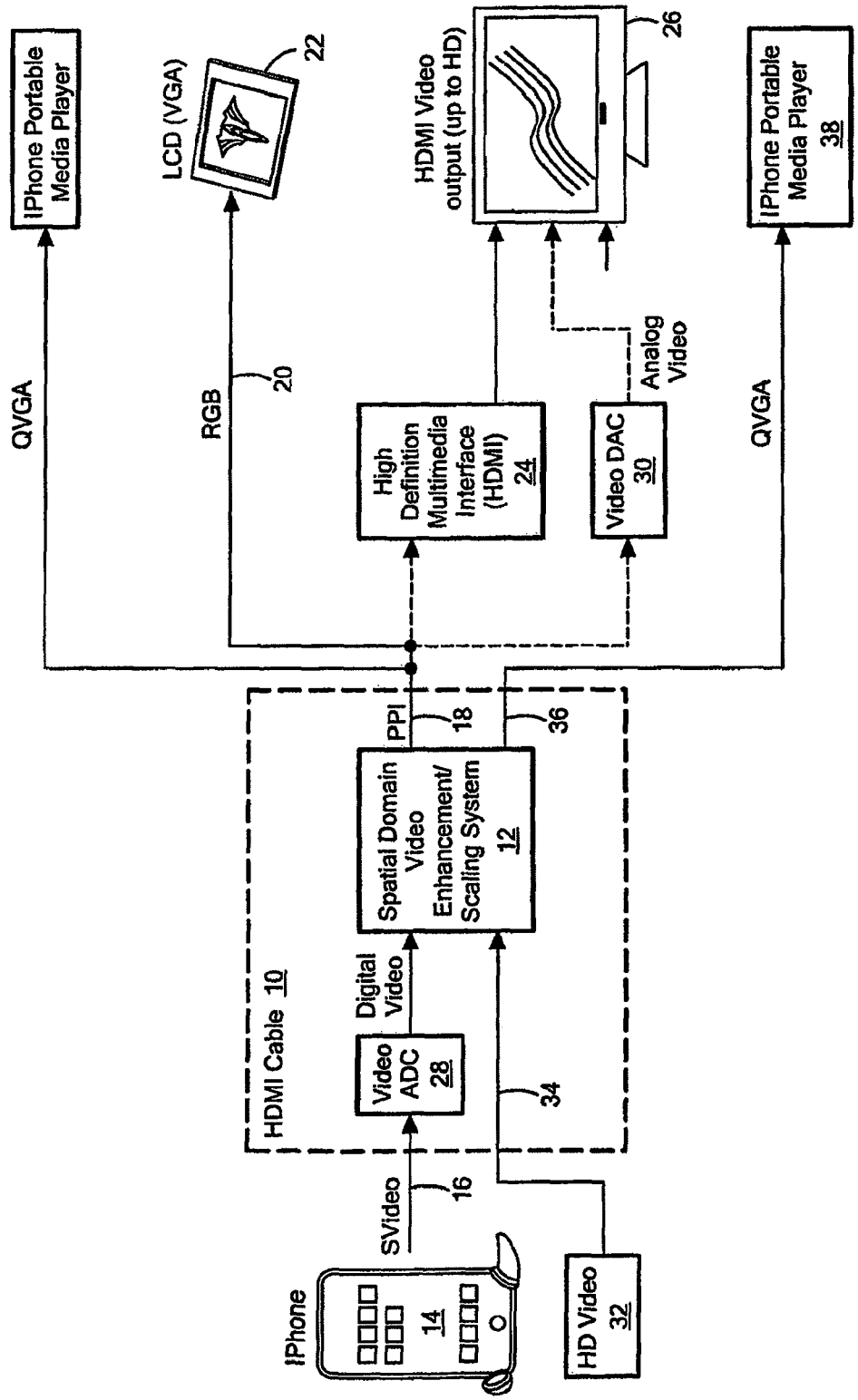
FIG. 1 is a schematic block diagram of a spatial domain video enhancement/scaling system according to this invention adapted to enhance and scale up or down.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 an HDMI cable 10 which includes the spatial domain video enhancements/scaling system 12 according to this invention. An Iphone or other portable media player 14, (typically having a QVGA format of 320× 240 pixels) provides a temporal video input such as S video on line 16 to HDMI cable 10 where it is enhanced and scaled up by spatial domain video enhancement/scaling system 12. The output, typically on a parallel port interface 18, may be in the form of an RGB signal 20 to drive an LCD (VGA) 22, or it may be provided to a high definition multi-media interface 24 to drive an HDMI video output display 26 up to HD which may have as many as 1920×1080 pixels. When the incoming signal on line 16 is an analog signal a video analog to digital converter 28 may be used. If it is desired to drive display 26 with an analog signal then the output 18 may be first passed through a video digital to analog converter 30.

This is the scale up version of the spatial domain video enhancement/scaling system 12. There is also an enhancement scale down version where, for example, 1080P-HD video 32 may provide the input at 34 (1920×1080 pixels) to spatial domain video enhancement scaling system 12 which here operates in the scale down version. Here the output 36 (320×240 pixels) will provide a QVGA signal to such as Iphones or other portable media 38.

Figure 2:
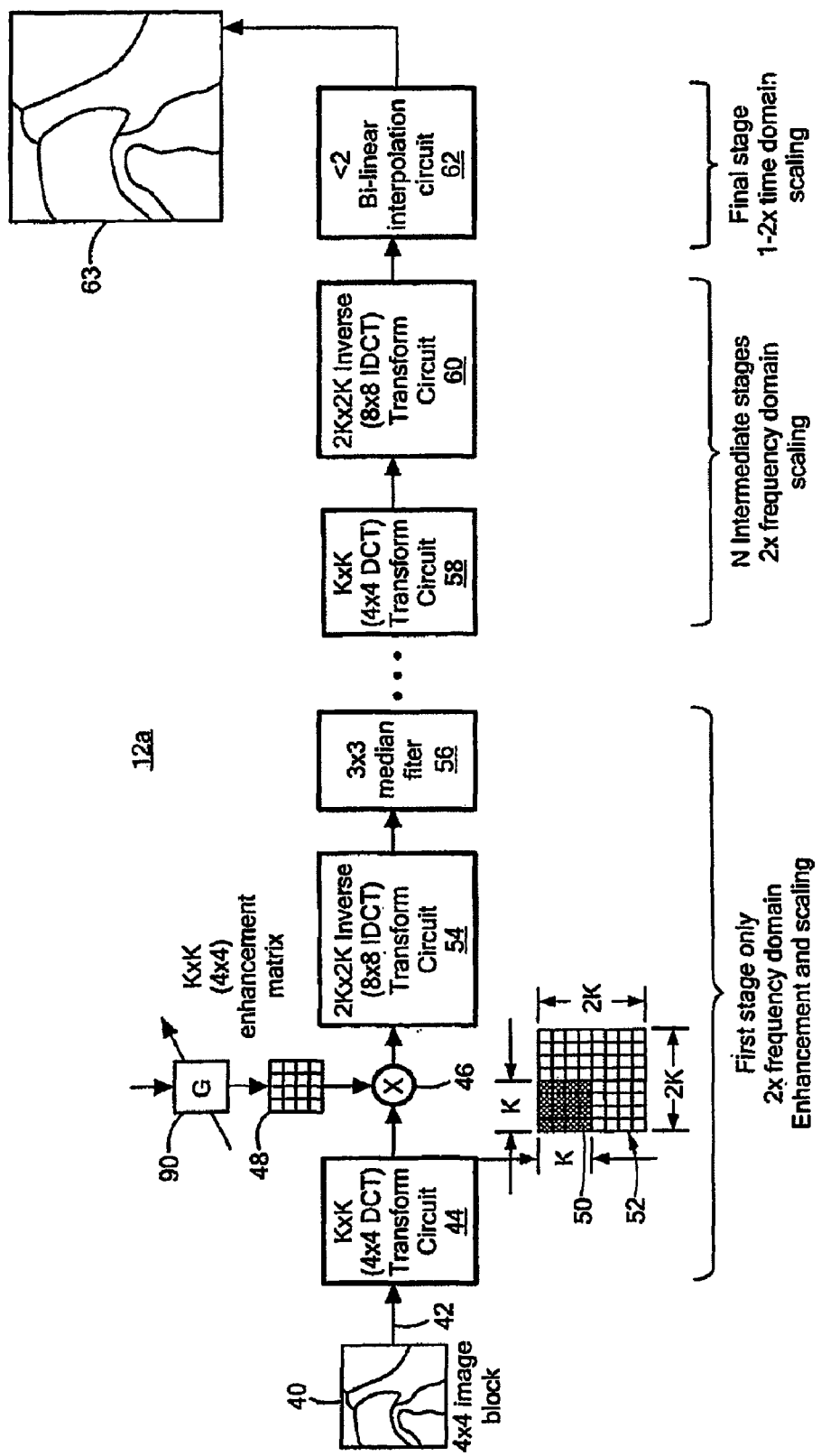
FIG. 2 is a schematic block diagram of a spatial domain video enhancement/scaling system according to this invention adapted to enhance and scale up.

The scale up version of spatial domain video enhancement/scaling system 12a, FIG. 2, receives, for example, a 4×4 image macroblock 40 as a video input in the temporal domain 42 to K×K transform circuit 44 which transforms the video input in the temporal domain to spatial domain coefficients. There is a multiplier circuit 46 and a K×K enhancement matrix 48 containing a corresponding K×K matrix of enhancement elements. Multiplier 46 multiplies these enhancement elements of K×K enhancement matrix 48 by the matrix of K×K spatial coefficients 44 to obtain enhanced spatial coefficients. These enhanced spatial coefficients are deposited in the upper left 50 K×K corner of a 2K×2K matrix 52. Matrix 52 is a zero padded matrix. Matrix 52 is now inversely transformed by inverse transform circuit 54 to 2× scale up the enhanced spatial domain coefficients and convert them back to the temporal domain. Following this a filter 56 may be used to smooth out the image and filter out noise. Transform circuit 44 and inverse transform circuit 54 may be any one of a number of different transform circuits, such as DCT or any "integer transform" like the one used in H.264 or VC1. Here there are depicted as discrete cosine like transforms (DCT). K×K transform circuit 44 is actually a 4×4, rank 4, DCT while 2K×2K inverse transform circuit 54 is an 8×8, rank 8, IDCT. Filter 56 may be a median filter and typically it may be a 3×3 median filter. The first stage constituted by transform circuit 44, multiplier 46, enhancement matrix 48, and inverse transform circuit 54 and filter 56 (if used) effects that 2X frequency domain enhancement and scaling. There may be N intermediate stages, where N can be zero, one, two and so on. Each N intermediate stage will also provide a 2X frequency domain scaling by using a K×K transform circuit 58 and a 2K×2K inverse transform circuit 60. Each stage would be thus constructed to provide a further 2X frequency domain scaling. Again, K×K transform circuit 58 may be a 4×4, rank 4, DCT while 2K×2K inverse transform circuit 60 may be an 8×8, rank 8, IDCT. There may also be a bilinear interpolation circuit 62 as a final stage to provide 1-2× time domain scaling when the scaling desired is not strictly (less than) a factor of 2. The final enhanced enlarged output appears at 63.

Figure 3:
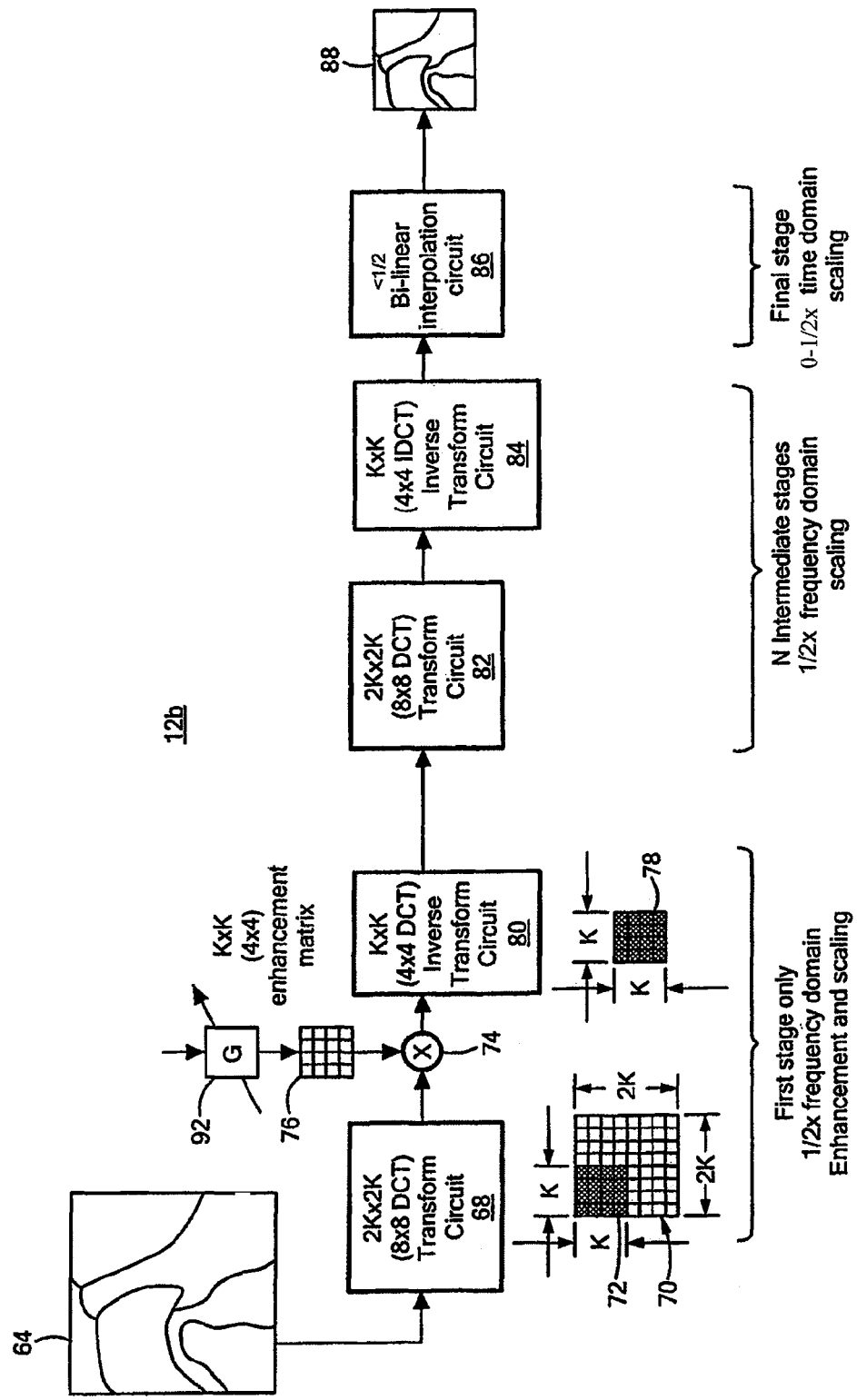
FIG. 3 is a schematic block diagram of a spatial domain video enhancement/scaling system according to this invention adapted to enhance and scale down.

A scale down version 12b of the spatial domain video enhancement/scaling system of this invention shown in, FIG. 3, also receives an image block 64 in the form of video input in the temporal domain 66 to 2K×2K transform circuit 68 which converts the video input 66 in the temporal domain to the spatial domain to produce a 2K×2K matrix of spatial coefficients 70. The upper left K×K corner 72 of spatial coefficients is then multiplied in multiplier 74 by the corresponding enhancement elements of K×K enhancement matrix 76. This produces a K×K matrix 78 of enhanced spatial coefficients which is then inversely transformed by inverse transformer circuit 80. 2K×2K transform circuit may be an 8×8, rank 8, DCT, and K×K inverse transform circuit 80 may be a 4×4, rank 4, IDCT. This first stage provides a ½ × frequency domain enhancement and scaling. There may be N intermediate stages where N may be zero, one, two . . . each of which provides ½ × frequency domain scaling. Each stage may include a 2K×2K transform circuit 82, such as an 8×8, rank 8, DCT and a K×K inverse transform circuit 84 such as a 4×4, rank 4, IDCT. Once again there may be a final stage of a bilinear interpolation circuit 86 to provide 0 to (½)× time domain scaling in the event that a scale down of other than exact (less than a) factor of ½ is required. The final output then is the enhanced scaled down image 88.

Figures 4, 5:
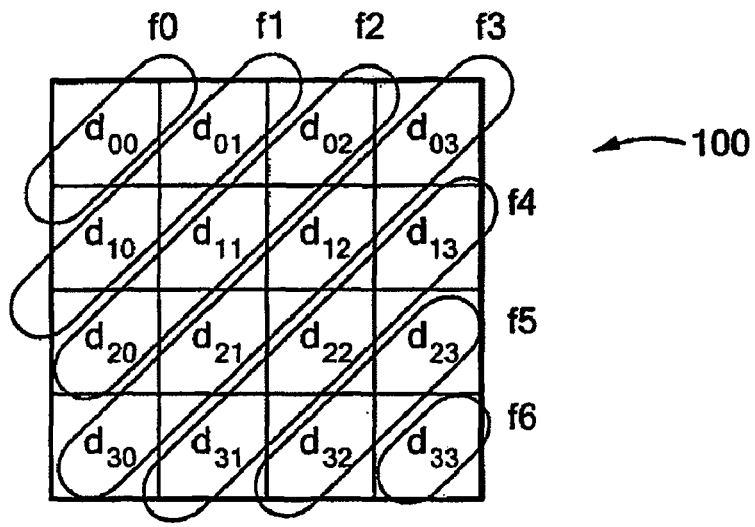
FIG. 4 is an illustration of a matrix of spatial domain coefficients exemplary of those matrixes in FIGS. 2 and 3.
FIG. 5 is an illustration on enhancement matrix exemplary of those in FIGS. 2 and 3.

The matrix of spatial domain coefficients 100, FIG. 4, is depicted as a rank 4, 4×4 matrix. In the upper left hand corner there is coefficient $d_{00}$ which forms group $f_0$. Group $f_1$ includes coefficients $d_{10}$ and $d_{01}$. Group $f_2$ includes coefficients $d_{20}$, $d_{11}$, and $d_{02}$ and so on with groups $f_3$, $f_4$, $f_5$, and $f_6$. The spatial frequency is lowest and the energy highest for the group $f_0$ and the spatial frequency increases while the energy decreases through $f_1$ $f_2$, $f_3$, $f_4$, reaching the highest spatial frequency and lowest energy at $f_6$.

The enhancement matrix is illustrated simply in FIG. 5 as a 4×4, rank 4, matrix 102. Each coefficient in the matrix of FIG. 4 corresponds to an element in enhancement matrix 102, FIG. 5. Thus looking at enhancement matrix 102 in FIG. 5, and spatial coefficients matrix 100 in FIG. 4 together it can be seen that the element 0 of enhancement matrix 102 corresponds to the coefficient $d_{00}$ (DC) in matrix 100. Elements $c_1$ and $c_1$ correspond to coefficients $d_{01}$ and $d_{10}$ and so on. Thus, while the spatial frequency increases from $d_{00}$ to $d_{33}$ the energy is the opposite. The energy is highest at $d_{00}$ and decreases toward $d_{33}$. Thus, by preserving the upper left hand corner, the majority of the image information is preserved. But, manipulating the lower energy, higher spatial frequency information towards $d_{33}$ the image can be sharpened because the higher spatial frequency information contains the edge information.

The enhancement matrix 48 and the enhancement matrix 76 may include gain adjust circuits 90 and 92, respectively, which may be used to vary all of the enhancement matrix elements 0 through $c_6$ see FIGS. 4 and 5, uniformly, all together as a group or in sub-groups corresponding to the groups $f_0$-$f_6$, for example, or individually. The enhancement matrix elements may be all made unity so that the system performs only scaling without enhancement. In a similar fashion if it were desired for some reason the matrixes could all be made of the same rank, that is all rank 4, 4×4's or all rank 8, 8×8's in order that there then could be enhancement but with no scaling.

Figure 6:
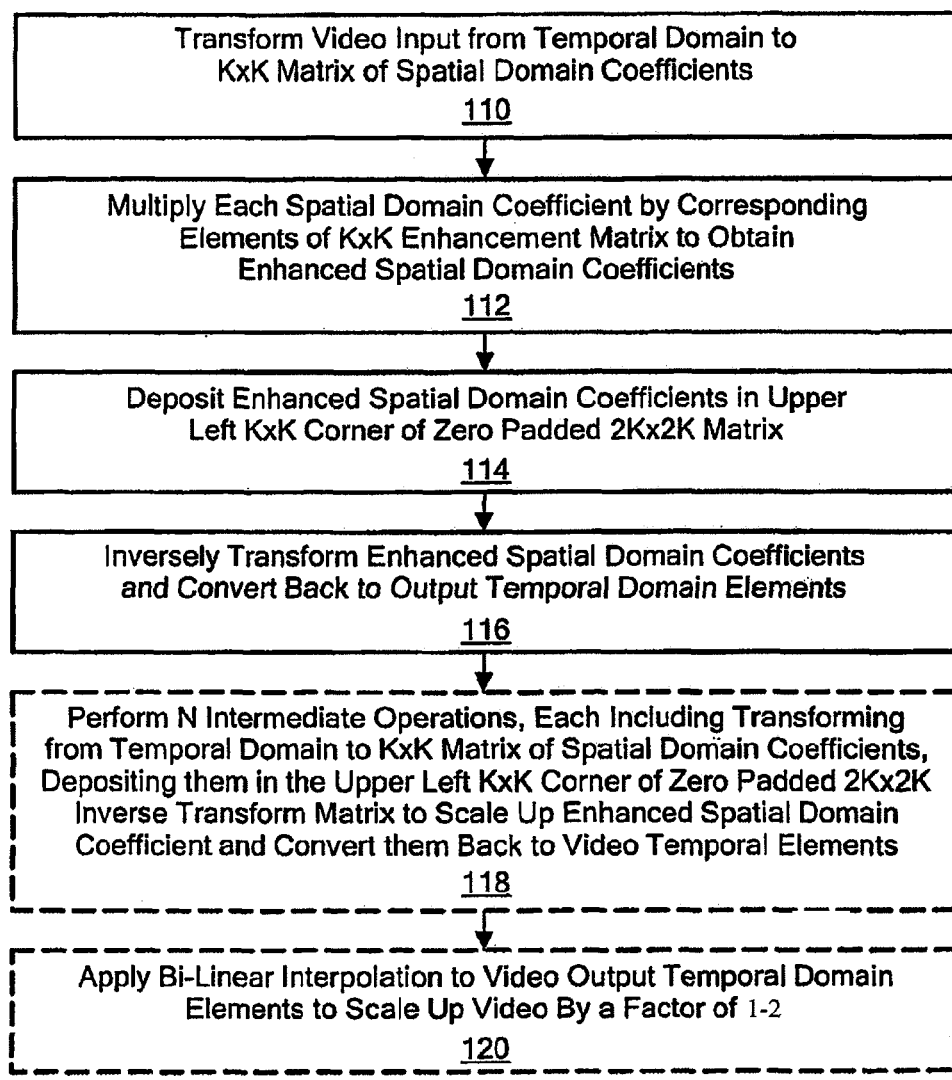
FIG. 6 illustrates the method of video enhancement/scaling up according to this invention.

The invention also contemplates a method of spatial domain video enhancement/scaling, both scaling up and scaling down. Scaling up is shown in FIG. 6. First the video input is transformed from the temporal domain to a K×K matrix of spatial domain coefficients 110. Then each spatial domain coefficient is multiplied 1 12 by corresponding elements of a K×K enhancement matrix to obtain enhanced spatial domain coefficients. Following this the enhanced spatial domain coefficients 114 are deposited in the upper left K×K corner of a 0 padded 2K×2K matrix. The enhanced spatial domain coefficients are now inversely transformed and converted back to output temporal domain elements 116. There may be performed N intermediate operations where N can be 0, 1, 2. 3 . . . , as shown in block 118. For each such operation, if there is one, the temporal domain is transformed to a K×K matrix of spatial domain coefficients depositing them in the upper left hand K×K corner of a 0 padded 2K×2K inverse transform matrix to scale up enhanced spatial domain coefficients and convert them back to the video temporal elements. There may also be an operation applying a bilinear interpolation 120 to the video output temporal domain elements to scale up the video by a factor of less than 2, somewhere between 1 and 2, in order to accommodate those scaling factors which are not strictly (are less than ) a factor of 2.

Figure 7:
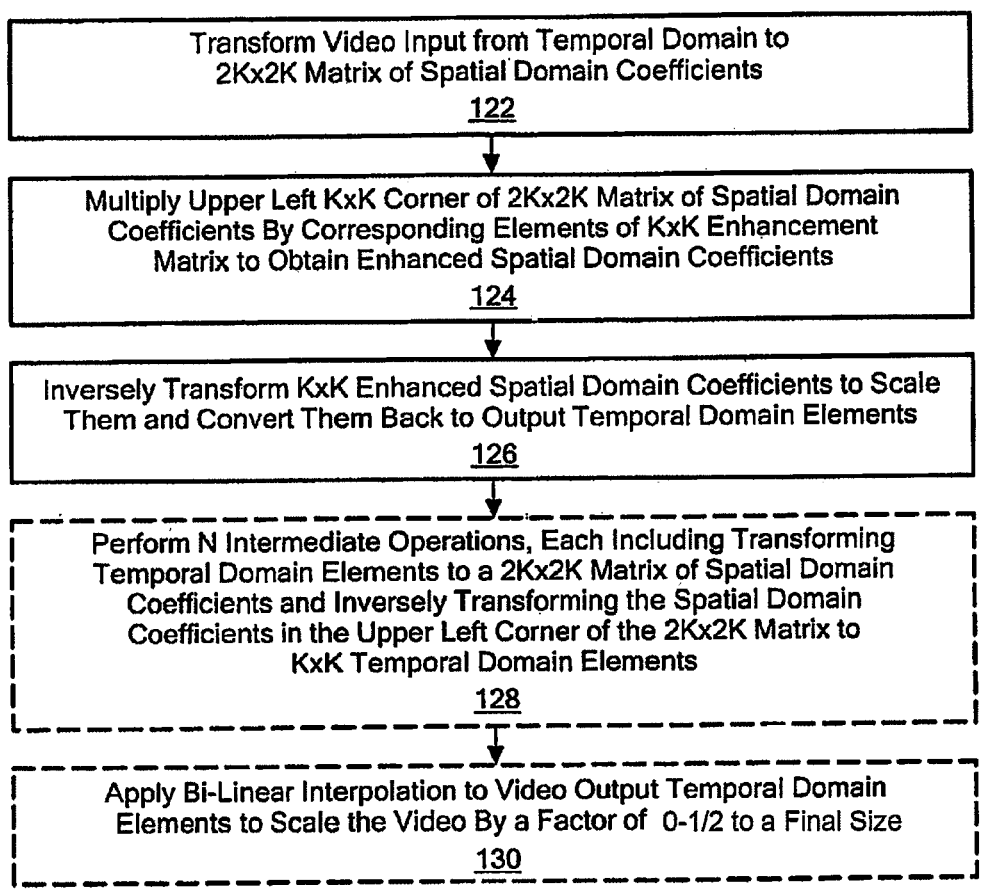
FIG. 7 illustrates the method of video enhancement/scaling down according to this invention

A scaled down version of the method of spatial domain video enhancement/scaling is shown in FIG. 7. The video input is transformed from the temporal domain to a 2K×2K matrix of spatial domain coefficients 122. Then the upper left K×K corner of the 2K×2K matrix of spatial domain coefficients is multiplied 124 by corresponding elements of a K×K enhancement matrix to obtain enhanced spatial domain coefficients. These enhanced spatial domain coefficients are inversely transformed to K×K matrix 126 to scale them and convert back to video output temporal domain elements. Again there may be a number of intermediate operations or none. That is, there may be N intermediate operations where N may be 0, 1, 3 . . . . Each operation may include transforming temporal domain elements to a 2K×2K matrix of spatial domain coefficients 128 and inversely transforming the spatial domain coefficients in the upper left corner of the 2K×2K matrix to K×K temporal domain elements. A bilinear interpolation may be applied to the video output temporal domain elements 130 to scale the video by a factor of 0-½ to the final size, again, to accommodate those situations where the overall scaling factor is not a simple factor of ½.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A spatial domain video enhancement/up-scaling system comprising:
    a first stage including a K×K transform circuit configured to receive temporal domain input video data and transform the temporal domain input video data to spatial domain video data having spatial domain coefficients;
    a gain adjust circuit configured to vary elements of a K×K enhancement matrix;
    a multiplier configured to multiply each spatial domain coefficient by corresponding elements of the K×K enhancement matrix to obtain enhanced spatial domain coefficients and deposit them in a K×K corner of a zero padded 2K×2K inverse transform matrix; and
    a 2K×2K inverse transform circuit configured to scale the enhanced spatial domain coefficients and convert them back to the temporal domain.

2. The spatial domain video enhancing/up-scaling system of claim 1 further including a bilinear interpolation stage to scale the temporal domain element video by a factor of 1-2 to the final size.

3. The spatial domain video enhancing/up-scaling system of claim 2 in which there is at least one intermediate stage between the first and bilinear interpolation stage, each intermediate stage including a K×K transform circuit for transforming the input of the temporal domain elements to spatial domain coefficients and depositing them in the upper left K×K corner of a zero padded 2K×2K inverse transform matrix; and a 2K×2K inverse transform circuit to scale the spatial domain coefficients and convert them back to video temporal domain elements.

4. The spatial domain video enhancing/up-scaling system of claim 1 in which said first stage includes a filter to reduce image noise.

5. The spatial domain video enhancing/up-scaling system of claim 4 in which said filter is a median filter.

6. The spatial domain video enhancing/up-scaling system of claim 5 in which said median filter is a 3×3 median filter.

7. The spatial domain video enhancing/up-scaling system of claim 1 in which said K×K transform circuit is a discrete cosine transform (DCT) circuit.

8. The spatial domain video enhancing/up-scaling system of claim 1 in which said 2K×2K inverse transform is an inverse discrete cosine transform (IDCT) circuit.

9. The spatial domain video enhancing/up-scaling system of claim 1 in which said K×K transform circuit is a 4×4 transform circuit.

10. The spatial domain video enhancing/up-scaling system of claim 1 in which said 2K×2K inverse transform circuit is an 8×8 inverse transform circuit.

11. The spatial domain video enhancing/up-scaling system of claim 1 in which the elements of said enhancement matrix are all unity (1's) and the system performs only scaling.

12. The spatial domain video enhancing/up-scaling system of claim 1, wherein the K×K corner comprises an upper left corner of the zero padded 2K×2K inverse transform matrix.

13. A spatial domain video enhancement/down-scaling system comprising:
    a first stage including a 2K×2K transform circuit configured to receive temporal domain input video data and transform the temporal domain input video data to spatial domain video data having spatial domain coefficients;
    a gain adjust circuit configured to vary elements of a K×K enhancement matrix;
    a multiplier configured to multiply the spatial domain coefficient in a K×K corner of said 2K×2K transform circuit by the corresponding elements of the K×K enhancement matrix to obtain enhanced spatial domain coefficients; and
    a K×K inverse transform circuit configured to scale the enhanced spatial domain coefficients and convert them back to the temporal domain.

14. The spatial domain video enhancement/down-scaling system of claim 13 further including a bilinear interpolation stage to scale the temporal domain element video by a factor of 0-½ to its final size.

15. The spatial domain video enhancement/down-scaling system of claim 14 in which there is at least one intermediate stage between said first stage and bilinear interpolation stage, each intermediate stage includes a 2K×2K transform circuit for receiving temporal domain elements and transforming them to 2K×2K matrix of spatial domain coefficients and a K×K inverse transform circuit for inverse transforming of the spatial domain coefficients in the upper left K×K corner of the 2K×2K transform circuit to K×K temporal domain elements.

16. The spatial domain video enhancement/down-scaling system of claim 13 in which said transform circuit is a discrete cosine transform (DCT) circuit.

17. The spatial domain video enhancement/down-scaling system of claim 13 in which said K×K inverse transform circuit is an inverse discrete cosine transform (IDCT) circuit.

18. The spatial domain video enhancement/down-scaling system of claim 13 in which said 2K×2K transform circuit is an 8×8 transform circuit.

19. The spatial domain video enhancement/down-scaling system of claim 13 in which said K×K inverse transform circuit is a 4×4 inverse transform circuit.

20. The spatial domain video enhancement/down-scaling system of claim 13 in which the elements of said enhancement matrix are all unity (1's) and the system performs only scaling.

21. The spatial domain video enhancing/down-scaling system of claim 13, wherein the K×K corner comprises an upper left corner of the 2K×2K transform matrix.

22. A method of spatial domain video enhancement/up-scaling comprising:
receiving temporal domain input video data;
transforming the received temporal domain input video data from the temporal domain to spatial domain video data, the spatial domain video data having a K×K matrix of spatial domain coefficients;
applying a gain to vary elements of a K×K enhancement matrix;
multiplying each spatial domain coefficient by corresponding elements of the K×K enhancement matrix to obtain enhanced spatial domain coefficients;
depositing the enhanced spatial domain coefficients in a K×K corner of a zero padded 2K×2K inverse transform matrix; and
applying an inverse transform to scale the enhanced spatial domain coefficients and convert the spatial domain video data back to the temporal domain.

23. The method of spatial domain video enhancement/up-scaling of claim 22 further including applying a bilinear interpolation to the video output temporal domain elements to scale the video by a factor of 1-2 to the final size.

24. The method of spatial domain video enhancement/up-scaling of claim 23 further including at least one more intermediate operation before the bilinear interpolation, each intermediate including transforming from the temporal domain to a K×K matrix of spatial domain coefficients and depositing the spatial coefficients in the upper left K×K corner of a zero padded 2K×2K inverse transform matrix to scale up the enhanced spatial domain coefficients and convert them back to video temporal elements.

25. The method of spatial domain video enhancement/up-scaling of claim 22 in which the video output temporal elements are filtered to reduce image noise.

26. The method of spatial domain video enhancement/up-scaling of claim 25 in which the video output temporal elements are median filtered.

27. The method of spatial domain video enhancement/up-scaling of claim 22 wherein transforming the received temporal domain input video data comprises applying a discrete cosine transform (DCT) to the received temporal domain input video data.

28. The method of spatial domain video enhancement/up-scaling of claim 22 wherein applying an inverse transform comprises applying an inverse discrete cosine transform (IDCT).

29. The method of spatial domain video enhancement/up-scaling of claim 22 in which said K×K matrix is a 4×4 matrix.

30. The method of spatial domain video enhancement/up-scaling of claim 22 in which said 2K×2K inverse transform matrix is an 8×8 matrix.

31. The method of spatial domain video enhancement/up-scaling of claim 22 in which the enhancement matrix elements are all unity (1's) and only scaling is performed.

32. The method of spatial domain video enhancement/up-scaling of claim 22, wherein the K×K corner comprises an upper left corner of the zero padded 2K×2K inverse transform matrix.

33. A method of spatial domain video enhancement/down-scaling comprising:
receiving temporal domain input video data;
transforming the received temporal domain input video data from the temporal domain to spatial domain video data, the spatial domain video data having a 2K×2K matrix of spatial domain coefficients;
applying a gain to vary elements of a K×K enhancement matrix;
multiplying a K×K corner of the 2K×2K matrix of spatial domain coefficients by the corresponding elements of the K×K enhancement matrix to obtain enhanced spatial domain coefficients; and
applying an inverse transform to the K×K enhanced spatial domain coefficients to scale the spatial enhanced spatial coefficients and convert the spatial domain video data back to the temporal domain.

34. The method of spatial domain video enhancement/down-scaling of claim 33 further including applying a bilinear interpolation to the video output temporal domain elements to scale the video by a factor of 0-½ to the final size.

35. The method of spatial domain video enhancement/down-scaling of claim 33, further including at least one more intermediate operation before the bi-level interpolation, each intermediate operation including transforming temporal domain elements to a 2K×2K matrix of spatial domain coefficients and inversely transforming the spatial domain coefficients in the upper left corner of the 2K×2K matrix to K×K temporal domain elements.

36. The method of spatial domain video enhancement/down-scaling of claim 33 wherein transforming the received temporal domain input video data comprises applying a discrete cosine transform (DCT) to the received temporal domain input video data.

37. The method of spatial domain video enhancement/down-scaling of claim 33 wherein applying an inverse transform comprises applying an inverse discrete cosine transform (IDCT).

38. The method of spatial domain video enhancement/down-scaling of claim 33 in which said K×K matrix is a 4×4 matrix.

39. The method of spatial domain video enhancement/down-scaling of claim 33 in which said 2K×2K matrix is an 8×8 matrix.

40. The method of spatial domain video enhancement/down-scaling of claim 33 in which the enhancement matrix elements are all unity (1's) and only scaling is performed.

41. The method of spatial domain video enhancement/down-scaling of claim 33, wherein the K×K corner comprises an upper left corner of the 2K×2K transform matrix.

* * * * *